No. 803,300. PATENTED OCT. 31, 1905.
E. S. MORRIS.
NUT LOCK FOR AXLES.
APPLICATION FILED DEC. 5, 1904.
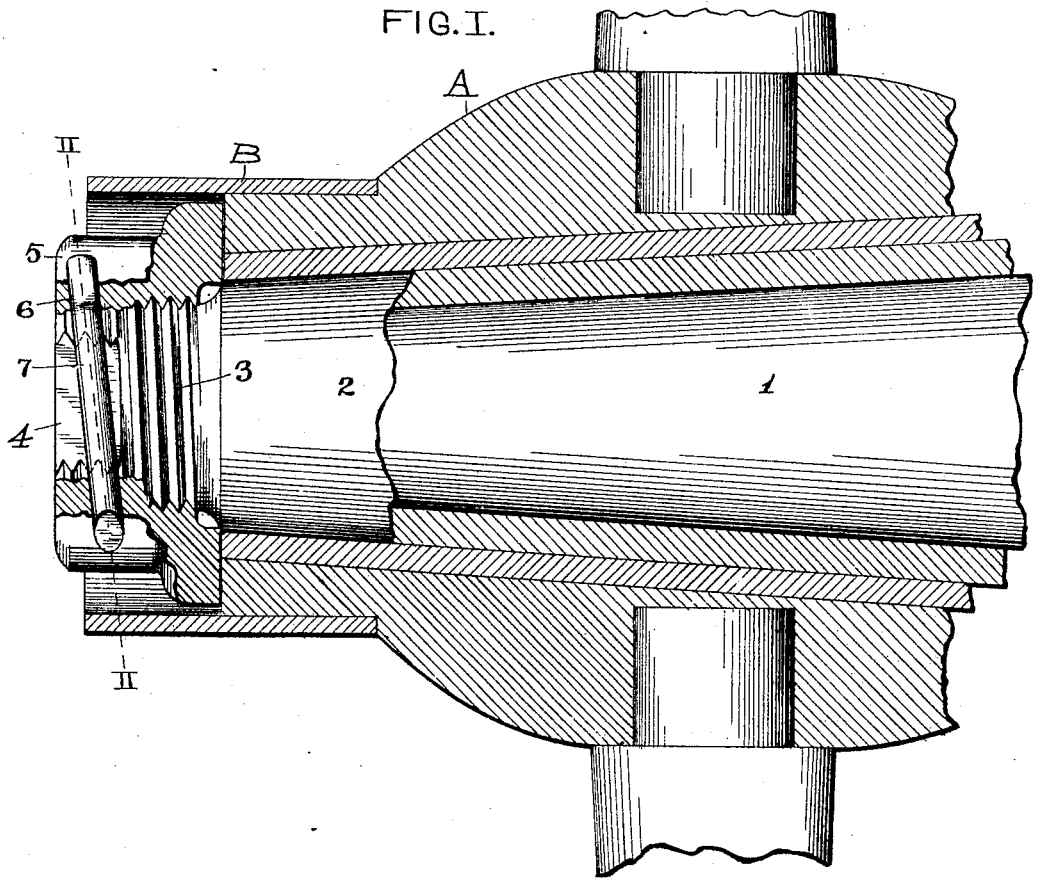
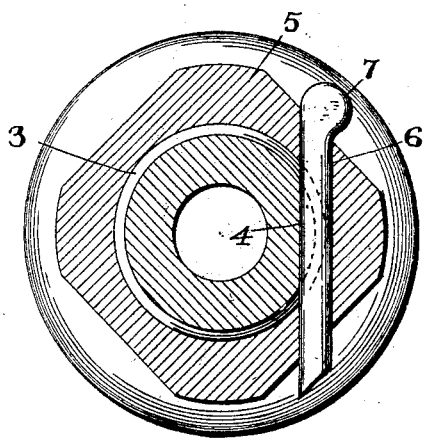
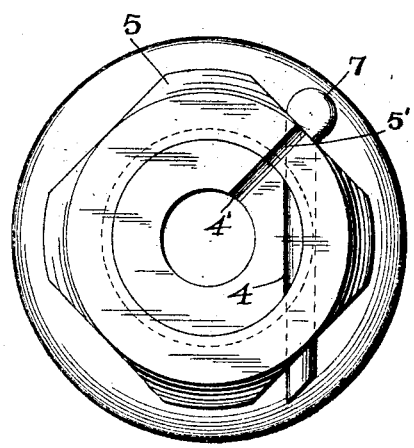
ATTEST.
H. J. Fletcher.
Nellie V. Alexander.
INVENTOR.
E. S. MORRIS.
BY Knight Bro
ATTY'S

UNITED STATES PATENT OFFICE.

EMANUEL S. MORRIS, OF ST. LOUIS, MISSOURI.

NUT-LOCK FOR AXLES.

No. 803,300.  Specification of Letters Patent.  Patented Oct. 31, 1905.

Application filed December 5, 1904. Serial No. 235,469.

*To all whom it may concern:*

Be it known that I, EMANUEL S. MORRIS, a citizen of the United States, residing in the city of St. Louis, in the State of Missouri, have invented certain new and useful Improvements in Nut-Locks for Axles, of which the following is a full, clear, and exact description, reference being had to the accompanying drawings, forming part of this specification.

My invention relates to a nut-lock for securing nuts upon the threaded ends of axles to effectually secure vehicle-wheels fitted thereto from escape.

Figure I is a longitudinal section of the spindle portion of an axle with the hub of a vehicle-wheel thereon and a nut constructed in accordance with my improvement applied to the axle. Fig. II is an enlarged cross-section taken on inclined line II II, Fig. I. Fig. III is an end view of my nut-lock.

1 designates the end of a vehicle-axle, and 2 a spindle surrounding the axle in the form of a skein. This spindle may, however, instead of being in the form of a skein be an integral part of the axle. The spindle 2 is provided with a threaded outer end 3, the threaded end being provided with a flattened portion 4, produced by cutting away parts of the threads of the threaded end.

5 is a nut that is interiorly threaded, corresponding to the threaded spindle end 3, and is provided with a keyway 6, extending transversely therethrough for the reception of a key 7. When the nut 5 is screwed onto the threaded spindle end, it is brought to a position that will cause the keyway therein to coincide with the flattened portion 4 of the spindle end, and the key is introduced through the keyway to bear against said flattened portion and prevent the nut from turning, whereby it is securely held to the spindle. The keyway 6 extends through the axle-nut in oblique direction, as seen in Fig. I, in order that it may be readily introduced into the nut without interference occurring between the key and the nut-encircling band B of the vehicle-wheel hub A in which the axle-spindle is fitted.

For the purpose of indicating the proper positioning of the nut on the threaded end of the spindle to permit of the insertion of the key, so that it will rest against the flattened portion of the spindle end, I form an indicating-groove 4' in the outer face of the spindle end and a corresponding indicating-groove 5' in the outer face of the axle-nut, as seen in Fig. III. When in turning the nut upon the spindle end the groove 5' is brought to the groove 4', the nut is shown to be properly positioned and the key may be readily introduced.

As will be seen, the keyway 6 extends through one corner of the nut instead of transversely through the body of the nut, so as to position said keyway alongside of the circumference of the threaded end of the spindle to be brought to the flattened portion 4. It will also be seen that the flattened portion 4 extends over a considerable surface of the threaded end of the spindle, and therefore the nut may be entirely screwed home on the threaded spindle end or may be positioned thereon outwardly from the full extent of its inward movement. This provides for the application of the key to bear against the flattened portion of the spindle end without the nut being in any particular position other than that in which the keyway therein will be in line with the flattened portion of the spindle end. As a consequence hubs of wheels of varying lengths may be used upon the spindle and secured by the nut with the nut held as securely in one position as another on the threaded end and preventing endwise movement of the wheel-hub.

I claim as my invention—

The combination with a wheel-hub having a band projecting outside of its outer end, of an axle-spindle fitted in said hub and having a threaded end encircled by said band and provided with a flattened portion extending inwardly beyond the outer edge of the band, a nut having a keyway extending through one of its corners, and a key inserted through said keyway to bear against the flattened portion of the axle-spindle end, said keyway extending obliquely in the nut to permit of the key being inserted within the plane of the encircling band without interference with the band; said spindle end and axle-nut being provided with indicating-grooves formed in their outer faces, substantially as set forth.

EMANUEL S. MORRIS.

In presence of—
NELLIE V. ALEXANDER,
E. S. KNIGHT.